(No Model.) 2 Sheets—Sheet 2.
P. W. DOHERTY.
OPERATING MECHANISM FOR VALVES OF WATER CLOSET OR OTHER TANKS.
No. 411,889. Patented Oct. 1, 1889.
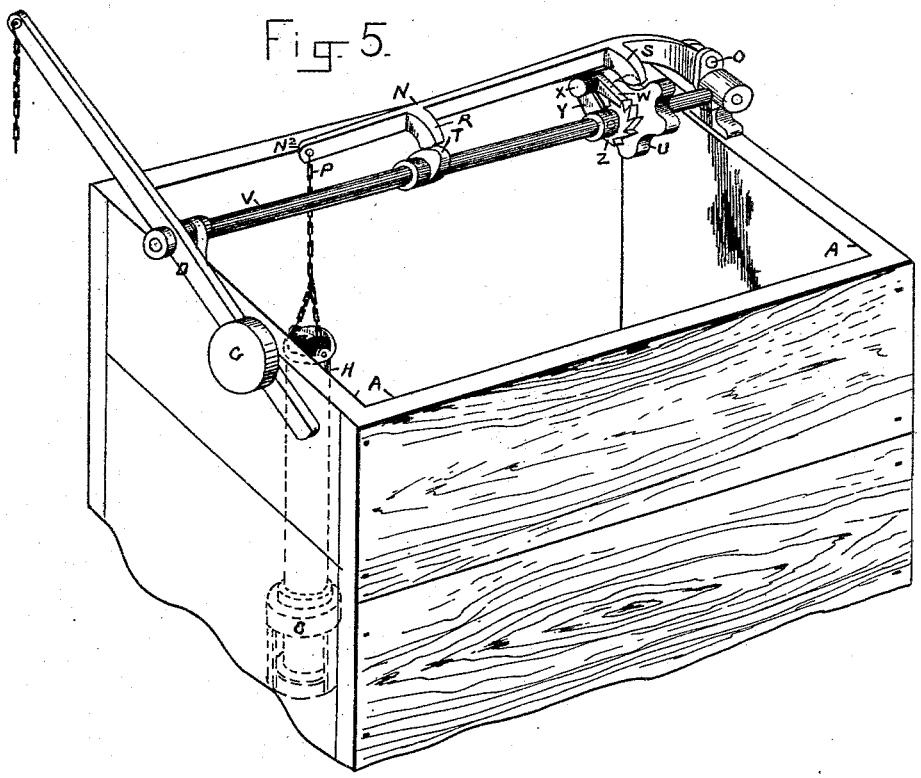
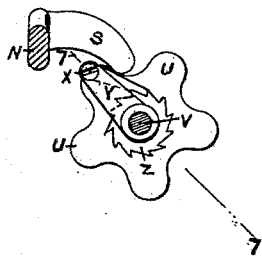
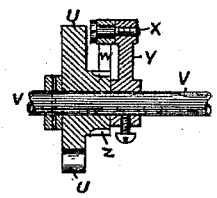
WITNESSES:
C. S. Gooding
Geo. G. Pent
INVENTOR:
Patrick W. Doherty
by Brown Bros.
Att'ys.

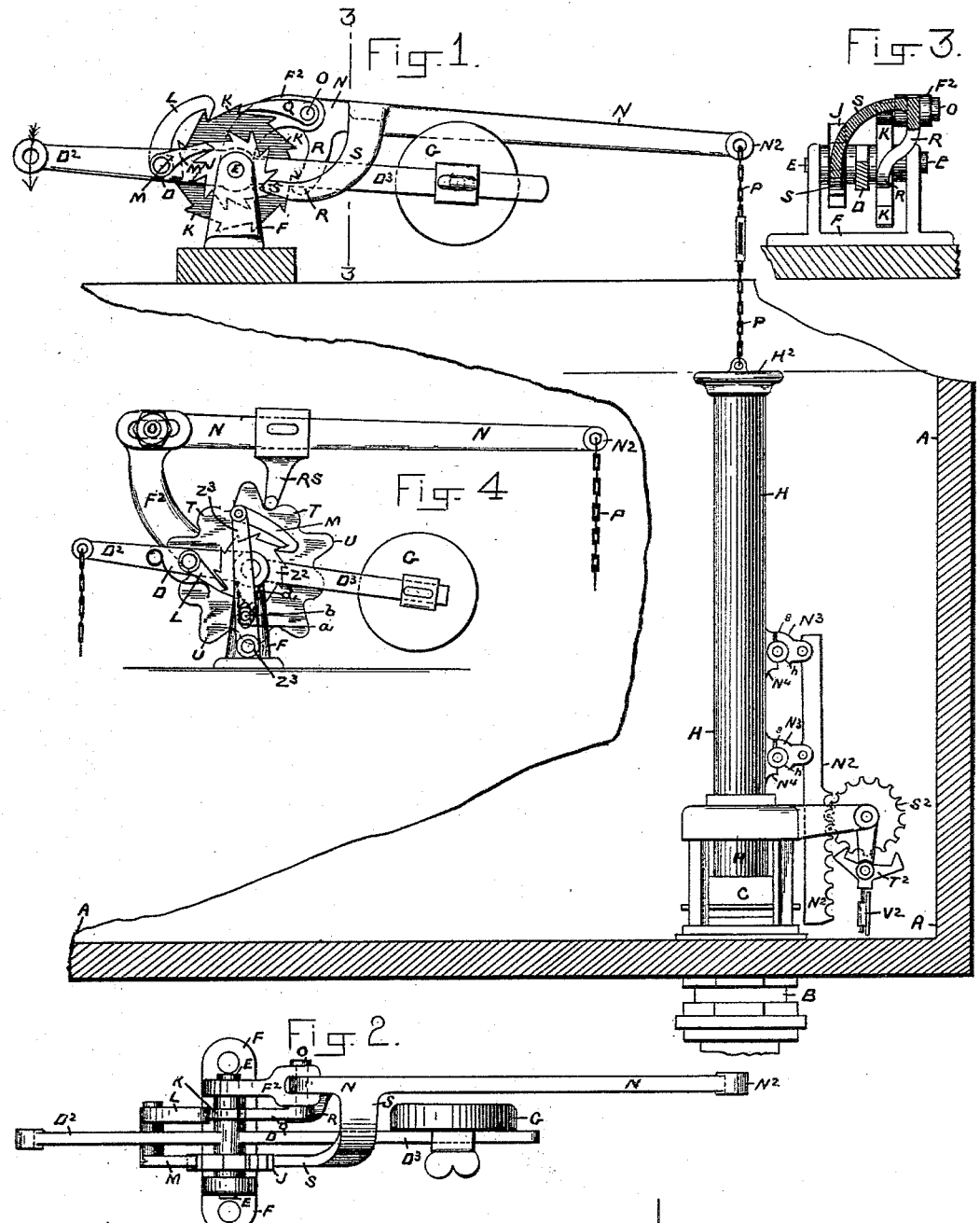

UNITED STATES PATENT OFFICE.

PATRICK W. DOHERTY, OF BOSTON, MASSACHUSETTS.

OPERATING MECHANISM FOR VALVES OF WATER-CLOSET OR OTHER TANKS.

SPECIFICATION forming part of Letters Patent No. 411,889, dated October 1, 1889.

Application filed September 3, 1888. Serial No. 284,512. (No model.)

*To all whom it may concern:*

Be it known that I, PATRICK W. DOHERTY, of the city of Boston, in the county of Suffolk and State of Massachusetts, have invented certain new and useful Improvements in Operating Mechanism for Valves of Water-Closet or other Tanks, of which the following is a full, clear, and exact description.

This invention relates to mechanism for operating valves of water-closet or other tanks to secure their opening and closing, and to mechanism for regulating, controlling, or governing the movement of the valve either in its closing or its opening.

The invention, in substance, consists, first, in the combination, with the opening and closing valve, which may be otherwise of the usual or any other suitable construction or arrangement, and a lever which is fulcrumed on a stationary support or equivalent mechanism therefor, and suitably adapted to be operated, of two cam or eccentric surfaces or edges carried by separate or in common by one ratchet-wheel, and severally rotating about a common axis, and adapted and arranged to be operated from said operating-lever or equivalent mechanism therefor, a lever fulcrumed on a stationary support and having a rest on said cam-surfaces, and connected to the valve, and all otherwise so that in each direction of movement of the operating-lever the lever connected to the valve is first moved in a direction to open the valve, and then allowed a movement in the opposite direction to close the valve or to leave the valve free to close; second, in the combination, with an opening and closing valve, which may be of the usual or any other suitable construction or arrangement, and mechanism suitable to secure its opening and closing, of a toothed or geared rack-bar attached at its opposite ends by links either to the valve or a part moving with the valve, so as to have a given limited parallel movement thereon in opposite directions, and of a gear-wheel turning on a suitable stationary support and in position to mesh said rack-bar, and all otherwise so that in one direction of movement of the valve said rack-bar moves out of, and in the other direction of the movement of the valve moves into, mesh with said gear-wheel.

In the drawings forming part of this specification, Figure 1 is a longitudinal vertical section of a water-tank and its discharge-pipe and a side elevation of the valve closed and mechanisms of this invention to secure an opening of the valve in both movements of an operating-lever, and to allow the valve after each opening to close and to regulate it in each closing movement. Fig. 2 is a plan view of the mechanism for opening the valve and allowing it to close. Fig. 3 is a transverse vertical section, line 3 3, Fig. 1. Fig. 4 is a view in detail in modification, as will hereinafter appear. Fig. 5 is a perspective view of a tank and the mechanism of this invention in a modified construction and arrangement from that shown in the preceding figures. Figs. 6 and 7 are views in detail, hereinafter referred to.

In the drawings, A is a tank.

B is a discharge-pipe leading from the bottom of the tank.

C is a valve for opening and closing the discharge-pipe at the tank, suitably arranged, and, as well known, in opening and closing to move and to be guided directly vertically, and D is a lever having a fulcrum E of a stationary support F of the tank, and at one end $D^2$ suitably connected by a chain and pull, (not shown,) or otherwise, (not shown,) as well known, so as thereby to be moved in one direction, and at its other end $D^3$ weighted, as at G, or otherwise suitably adapted, and as well known, so as thereby to be moved in the other and opposite direction on a release of the power or force applied to its end $D^2$ to move it, and all and otherwise, except as to the features of this invention, as well known in the water-tank system of dwelling-houses, buildings, &c., or otherwise suitably, and therefore needing no more particular description herein.

H is an upright or vertical arm or extension of the valve C, and, as shown, constituting the overflow-pipe of the tank, opening (not shown) at its upper end $H^2$ to the water-space of the tank, and at its lower end (not shown) having communication through the thickness of the valve with the discharge-pipe B, and in itself, neither as a whole nor as to its separate parts forming any part of this invention.

J K, Figs. 1 and 2, are two ratchet-wheels, both free to turn on the fulcrum E of the operating-lever D, and their teeth (particularly shown as of equal depth) are presented in opposite directions. L M are two gravity-pawls separately hung on a common horizontal fulcrum-pin of the operating-lever, and located so that in the movement of the operating-lever in one direction the one L at its toe engages the teeth of and thus rotates its ratchet-wheel K, and the other M at its toe passes freely over the teeth of its ratchet-wheel J, and in the movement of the operating-lever in the other direction the one M at its toe engages the teeth of and thus rotates its ratchet-wheel J, and the other L passes freely over the teeth of its ratchet-wheel K.

N is a lever, having a fulcrum at O of an upward and lateral extension of the support $F^2$ for the operating-lever.

P is a chain; but it may be any other line, flexible or inflexible, but preferably flexible, and at its opposite ends is connected to the end portion $N^2$ of the valve-lever N and to the upper end of overflow-pipe and valve-extension H.

Q is a gravity stop-pawl fulcrumed on the valve-lever N, and at its toe engaging with the teeth of the ratchet-wheel K, and so as to hold the ratchet-wheel against accidental movement, while allowing it to turn under the operation of the pawl L, as has been described.

R S are two arms projecting from the valve-lever N, and in planes to rest, the one R at its toe end on the ratchet-wheel K and the other S at its toe end on the ratchet-wheel J, as has been described, to secure first a movement of the valve-lever, and in a direction to open the valve, and then to allow the valve-lever to return to its normal position, and thereby to secure a close of the valve, or to leave the valve free to close, an arrangement for the latter way being the one shown.

The arms R S join the valve-lever N at unequal distances from but on the same side of the fulcrum of the lever, and between the fulcrum and the end of the valve-lever at which the valve is connected. The arm S is at the greater distance from the fulcrum of valve-lever, and thus, on the same and a given length of movement of it and the arm R from the common axis of rotation of the ratchet-wheels J K, on which they rest, respectively, the valve-lever N, at its end connected to the valve, from the action of the ratchet-wheel J on it working through the arm S is moved or lifted a less distance than it is from the action of the ratchet-wheel K on it working on the arm R. By means of this equal depth of teeth in the two ratchet-wheels J K and unequal distances of the connection of the arms S R with the valve-lever N as to the fulcrum of said lever, washes of unequal length and quantity can be obtained—that is, a "preliminary" and an "after" wash, as they are termed and well known.

It is preferable to have the teeth of the ratchet-wheels of equal depth and the difference in lift of the valve secured by the relative connection of the arms of the valve-lever described; but the teeth of the ratchet-wheels may be of unequal depth, and such as to have the ratchet-wheels of themselves working on the valve-lever secure the unequal amount of opening of the valve described for the purpose stated.

In the operation of the ratchet-wheels to move the valve-lever, as described, each ratchet-wheel works as a cam or eccentric on the lever, and obviously each ratchet-wheel could be provided with a cam-acting surface independent of but rotating in unison with it. Again, in the movement of the operating-lever D from and to its normal position the valve-lever N is operated twice, and each operation is from the rotation of cams caused by the operating-lever and the one in one direction and the other in the other direction of the movement of the operating-lever.

The mechanism particularly described is most effectual and practical for the purposes and operations of the valve-lever, as stated; but modifications thereof, such as shown in Figs. 4, 5, 6, and 7, may be substituted for it. These modifications will be now described, which, however, in form and arrangement, vary, as will now appear.

In Figs. 5, 6, and 7, T and U are the cams for raising the valve-lever from the movement of the operating-lever D in each direction, and these cams are carried by a rocker-shaft V, directly rocked by said lever. Both cams act directly on the valve-lever through separate arms R S of the valve-lever, as before explained. Again, both cams are rotated from an operating-lever D in connection with a rocker-shaft common to both, and which at its opposite end portions has bearings in suitable stationary supports. The cam T is fixed to and the cam U is loose on the rocker-shaft V, and the rotation of the latter cam is secured in one direction of the rotation of the shaft by the then engagement of a gravity-pawl W, fulcrumed at X on an arm Y, fixed to shaft V, with the teeth of the ratchet-wheel Z integral with the cam, and the action of the cam U on the valve-lever is such as to secure the greater opening of the valve, its lesser opening being secured by the fixed cam T of the rocker-shaft. The cam T, shown and described as fixed, may be loose on the rocker-shaft and made integral with a ratchet-wheel having its teeth presented in the opposite direction to those of the ratchet-wheel Z, and its rotation secured by a gravity-pawl, which is fulcrumed on an arm of the rocker-shaft, and which in the direction of the rock of the shaft opposite to that in which the pawl Y and ratchet-wheel Z are engaged is engaged with the teeth of ratchet-wheel integral with cam T.

In Fig. 4 the two cams T U of Figs. 5, 6, and 7 are shown as in one piece and alternating with each other about the axis of the fulcrum E of the operating-lever, and the lever N has a single arm R S, by which to rest thereon.

This double cam is loose on the lever-fulcrum and has a ratchet-wheel Z² integral with it and engaged by two pawls L M, working in opposite directions thereon—one in one movement and the other in the other movement of the operating-lever. The pawl L is carried by the operating-lever and the pawl M is at one end of a vertical arm Z³, fulcrumed at its lower end to a stationary support, and intermediate of its length has a lengthwise slot $a$, receiving a pin $b$ of a crank-arm $d$, rocking about the fulcrum-axis of the operating-lever as it is moved. By this arrangement of pawls, in combination with a single but double acting cam and a common operating-lever for both pawls, the valve-lever is operated in both directions of movement of the operating-lever to open the valve, and then the lever left free to return to its normal position, as also the valve to close.

In regard to regulating, governing, or controlling the movement of the valve in either direction, preferably its closing, this invention pertains particularly to such mechanisms as embrace in their construction and arrangements of parts a rack or tooth bar and a gear-wheel connection between the valve or some part moving with it and the means particularly employed to serve as the regulator, governor, or controller of the valve in its movement. Illustrations of this class of mechanisms are in the several applications of myself for Letters Patent of the United States, Serial Nos. 284,510, 284,511, and 283,471, to all of which reference is hereby had for a more particular understanding thereof. In this relation the invention is particularly illustrated in connection with the pallet and escape-wheel mechanism of application, Serial No. 284,510.

S² is the escape-wheel. T² is the pallet, having pendulum V², and N² is a rack or tooth bar on the valve to drive from the movement of the valve on its close the escape-wheel, all except as to this invention fully explained in said application.

The rack-bar N² is vertical, and it is at one side of and parallel with the vertical axis of the valve, and at its opposite end portions are links N³ N³, pivoted to it, and also to horizontal projecting ear-pieces N⁴ N⁴ of the valve-extension. Each link has shoulders $g$ $h$ located at opposite points, and these shoulders on the swing in opposite directions of the links make abutment on the ear-pieces of the valve-extension to limit the throw of the rack-bar toward and away from the vertical axis of the valve, and in relation to which it moves in parallel planes.

The shoulders $g$ $h$ of the links N³, connecting rack-bar and valve, as stated, and also the faces N⁴ N⁴ of the valve for the abutment of said shoulders in the movement of the rack-bar toward and away from the vertical axis of the valve, are arranged in relation to each other so as, in the upward movement or opening of the valve, to allow the rack-bar to be moved inward and toward the axis of the valve, and thus out of engagement with the escape-wheel from the co-operative action of the teeth of said bar and said wheel on each other in said movement of the valve, and thus put the valve out of connection with the escape-wheel and pallet mechanism, and in the downward movement or closing of the valve, on the then movement of the rack-bar outward from the vertical axis of the valve to secure and maintain an engagement of the bar with the escape-wheel, and thus bring the escape-wheel and pallet mechanism into play to control, regulate, or govern the closing movement of the valve, as fully described in the application aforesaid.

A rack-bar hung to operate, as described, in the movement of the valve, as is obvious without particular description, may be adapted to other of the mechanisms referred to for regulating, governing, or controlling the movement of the valve, and this invention, as to the said hanging of the rack-bar, is not to be limited to the precise governing mechanism shown, and particularly described.

Having thus described my invention, what I claim, and desire to secure by Letters Patent of the United States, is—

1. The combination, with a tank for liquid, an outlet-pipe for the liquid, and an opening and closing valve for the outlet-pipe, of a cam rotating about a fixed axis and suitably adapted to be rotated, and a lever having a fixed fulcrum and adapted to rest on said cam and connected to the valve, so that on a rotation in one direction of said cam said lever is operated to open the valve and then the valve left free to close, substantially as described.

2. The combination, with a tank for liquid, an outlet-pipe for the liquid, and an opening and closing valve for the outlet-pipe, of a cam rotating about a fixed axis, a ratchet-wheel turning on a fixed axis to rotate in one direction of its rotation said cam, a pawl to engage and thus to rotate said ratchet-wheel, and adapted to be reciprocated about the axis of said ratchet-wheel, and a lever having a fixed fulcrum and adapted to rest on said cam and connected to the valve, all so that on a rotation in one direction of said cam said lever is operated to open the valve and the valve left free to close, substantially as described.

3. The combination, with a tank for liquid, an outlet-pipe for the liquid, and an opening and closing valve for the outlet-pipe, of two cams separately and independently rotating about a fixed axis common to both, two pawls—one for each cam—to engage and thus to rotate it, a device carrying said pawls and reciprocating them about the axis of said cams, and a lever having a fixed fulcrum and adapted to rest on each of said cams and connected to the valve, and all so that on a forward and backward reciprocation of said pawls about the axis of said cams one of the said cams will be rotated in said forward and the other in said backward reciprocation of the pawls, and thereby each of said cams rotated about its axis and said lever operated by each, securing two openings of the valve and a leaving of the valve to close after each opening, substantially as described, for the purpose specified.

4. The combination, with a lifting and dropping valve elevated by a positive connection with a valve-lifting mechanism of the water-closet, of a vertical toothed or rack bar $N^2$, links $N^3$ at their opposite ends pivoted to the rack-bar and to the valve or some part held thereon, and having abutment-shoulders $g$ $h$ at opposite points to abut against the valve or some part held thereon, and a gear-wheel turning on a fixed axis and arranged to mesh with said rack-bar, substantially as described, for the purpose specified.

In testimony whereof I have hereunto set my hand in the presence of two subscribing witnesses.

PATRICK W. DOHERTY.

Witnesses:
ALBERT W. BROWN,
FRANCES M. BROWN.